United States Patent Office 3,460,992
Patented Aug. 12, 1969

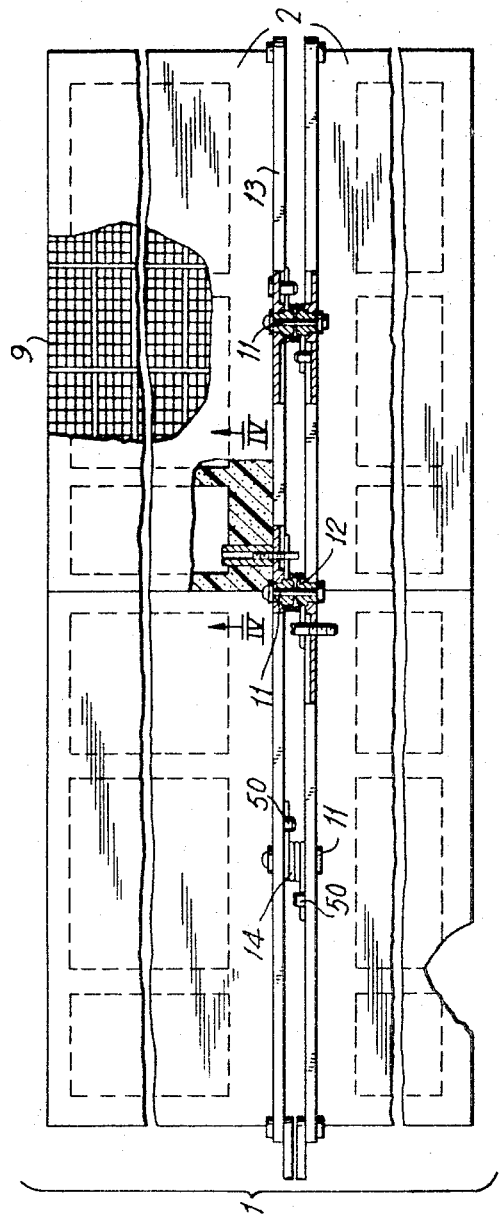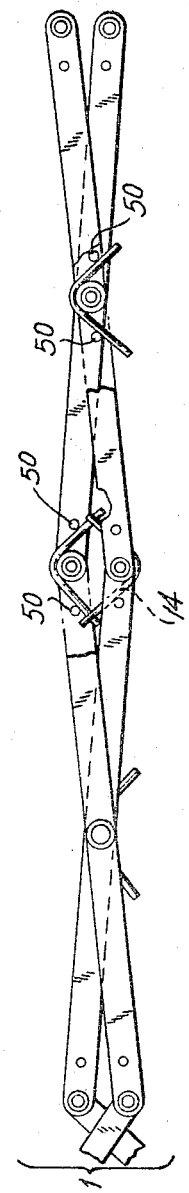

3,460,992
COLLAPSIBLE SOLAR PHOTOELECTRIC BATTERY
Viktor Zakharovich Avilov, Kievskaya ulitsa, 58, Vyacheslav Ivanovich Aralov, Streletskaya ulitsa, 17/19, kv. 12, Genrikh Stanislavovich Daletsky, ulitsa Akademika Komarova, 6, kv. 43, Boris Dmitrievich Ivanov, I Ostankinskaya ulitsa, 20, kv. 6, Grigory Vladimirovich Kantor, Bolshaya Gruzinskaya ulitsa 36, kv. 62, Evgeny Nikolaevich Pasternak, Bolshaya Akademicheskaya ulitsa 61/2, kv. 46, Leonard Markovich Raigorodsky, Prospect Mira, 182, kv. 19, Igor Stepanovich Schegolev, Bolotnikovskaya ulitsa 41, korpus 6, kv. 135, and Nikolai Vasilievich Shavrin, Bolshoi Kharitonovsky per. 25/10, kv. 10, all of Moscow, U.S.S.R.
Filed May 3, 1965, Ser. No. 452,805
Int. Cl. H01l 15/04
U.S. Cl. 136—89                                    9 Claims

ABSTRACT OF THE DISCLOSURE

A collapsible solar photoelectric battery having individual supporting plates with photocells on the active side of the plates, the plates being pivotally connected to each other to form an articulated "lazy-tongs" linkage. The linkage is extended and contracted by means of an electrical power drive which is coupled to the end links.

---

This invention relates to collapsible solar photoelectric batteries intended for direct conversion of solar energy into electric energy. The invention can be utilized as a source of power for artificial satellites under spaceflight conditions.

Provision of high power collapsible solar photoelectric batteries presents certain design difficulties.

A present are used solar photoelectric batteries composed of individual plates articulated to each other and provided with photoelectric cells on their active sides. Both the extension and the contraction of the batteries are affected by means of an actuating mechanism.

However, a disadvantage inherent in the above mentioned batteries is that a great number of kinematic elements included in the supporting structure and the actuating mechanism for extension and contraction of the battery, result in complicated design of the battery and in increased weight and size thereof.

Another disadvantage of the conventional batteries lies in fact that they demand special dampers to smooth out kinetic energy of the moving parts of the actuating mechanism when extending the battery.

This invention has for its object to simplify the supporting structure of a collapsible solar photoelectric battery.

It is another object of this invention to increase the dependability of said battery.

It is also an object of this invention to increase the power output of the solar photoelectric battery.

In accordance with the foregoing and other objects, the device of the present invention consists of said plates serving as linking elements of the supporting scissors-like articulated linkage.

Other objects and advantages of this invention will become apparent from a consideration of the following specification read in connection with the accompanying drawings, wherein:

FIG. 1 is a plan view partly broken away of the articulated linkage consisting of the plates of a collapsible solar photoelectric battery;

FIG. 2 is a diagrammatic side view of the linkage;

Figure 5:
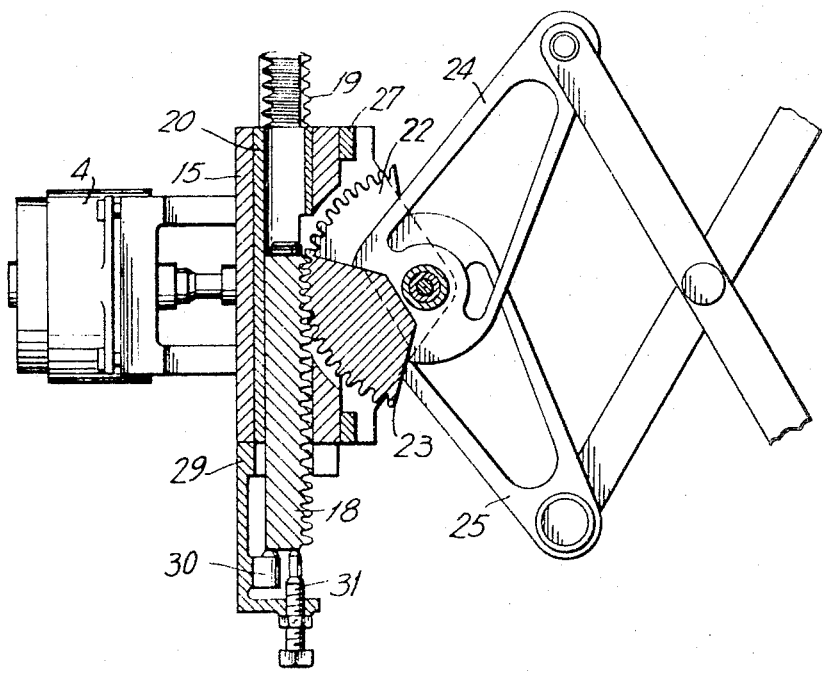
FIG. 5 is an elevation view partly in section of the electric power drive of a collapsible solar battery.
Figure 6:
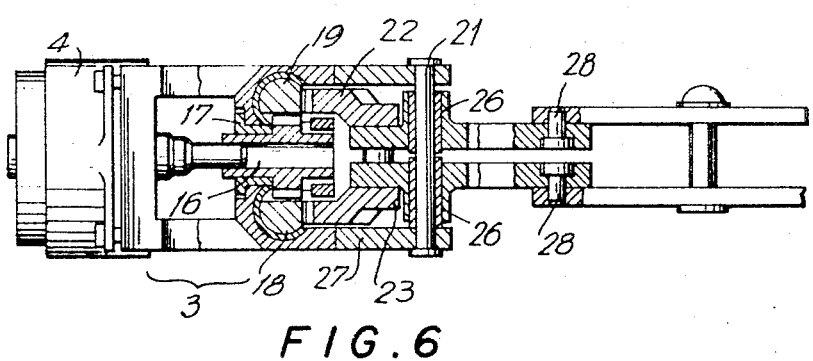
FIG. 6 is a plan view partly in section of the power drive.

The collapsible solar photoelectric battery comprises articulated linkage 1 of the "lazytongs" or "Nuremberg scissors" type (FIGS. 1 and 2) with supporting plates 2 attached thereto, and electric power drive 3 (FIGS. 5 and 6) consisting of electric motor 4 and extending mechanism 5, both serving to actuate articulated linkage 1.

Each supporting plate 2 of articulated linkage 1 is composed of middle member 6 constituted, for example, of foam plastic material and placed between top member 7 and bottom member 8 constituted, for example, of magnesium alloy and attached to member 6.

Figure 4:
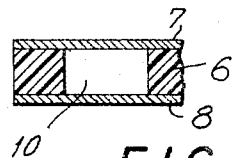
FIG. 4 is a partial longitudinal section through a plate.

Top member 7 of each plate 2 carries laminated semiconductor photocells 9 thereby forming the active side of side plate 2. To facilitate cooling of photocells 9, wide cuts 10 (FIG. 4) are provided in foam plastic member 6 and in bottom member 8, said cuts being indicated by dash outline in FIG. 1.

Figure 3:
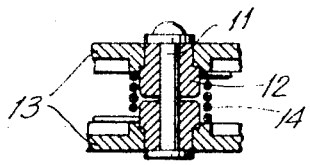
FIG. 3 is a cross-section of a pivot pin of one of the plates composing the above mechanism.

Plates 2 of the articulated linkage are connected to each other by hinge means at their ends and middle, each hinge means being constituted by hinges formed from pivot pins 11 (FIG. 3) rotating in plain bearing 12, said plain bearings being mounted in metal links 13 which, in turn, are attached to the ends of foam plastic members 6 of each plate 2, which bearings operate as pivots of articulated linkage 1 wherein said plates 2 serve as linking elements.

To minimize the moment of inertia applied to bearings 12 during the extension of articulated linkage 1, provision is made for coil springs 14 so mounted that, with the solar battery contracted, the springs bear against retainers 50 provided on links 13 and are thereby brought under tension.

Both the extension and the contraction of the solar battery are carried out by means of electric power drive 3 disposed on body 15. The shaft of electric motor 4 is provided with pinion 16 rotatably mounted in plain bearings 17. When rotating pinion 16, toothed racks 18 and 19 connected thereto are capable of moving in opposite direction, said racks being slidably mounted in bronze sleeves pressed into body 15.

Racks 18 and 19 are so installed that they can rotate sectors 22 and 23 together with levers 24 and 25 relative to pivot pin 21, said pivot pin being mounted in bronze sleeves 26 provided on bracket 27 which is attached to body 15. Levers 24 and 25 are pivotally connected to the plates by means of pins 28 and plain bearings mounted in the ends of plates 1.

To limit the extension of the battery and to make it possible to adjust the travel of racks 18 and 19, provision is made for limit microswitch 30 and adjustable screw 31, both being mounted on bracket 29 connected to body 15.

Activation of electric motor 4 and rotation of pinion 16 result in moving toothed racks 18 and 19 in opposite directions, which racks, in turn, cause sectors 22 and 23 meshed therewith to rotate, whereas levers 24 and 25 of said sectors make the articulated linkage extend the battery into the working position as illustrated in FIGS. 1 and 2.

The contraction of the battery is achieved by the reversal of the electric motor.

The battery of the design described hereinabove can be utilized as a source of power for both spaceflight and ground application.

What is claimed is:

1. A collapsible solar photoelectric battery comprising individual supporting plates having opposite surfaces, photocells on the surfaces of said plates, means pivotably connecting the plates to each other to form an articulated "lazy-tongs" linkage, each supporting plate constituting a link element of said linkage.

2. A collapsible solar photoelectric battery as claimed in claim 1 wherein said means pivotably connecting said plates comprises hinge means for each plate constituted by a hinge at each end of the plate and a hinge in the center of the plate, each hinge connecting the plate to a respective other plate.

3. A collapsible solar photoelectric battery as claimed in claim 1, comprising drive means coupled to said linkage to effect both extension and contraction of said linkage.

4. A collapsible solar photoelectric battery as claimed in claim 3 wherein said linkage has opposite ends and said drive means is coupled to the links at one of said ends.

5. A collapsible solar photoelectric battery as claimed in claim 4 wherein said drive means comprises an electric motor, and rack and pinion means coupled to said motor to be driven thereby and coupled to said links at said one end of the linkage to extend and collapse the same.

6. A collapsible solar photoelectric battery as claimed in claim 1 wherein each plate comprises a top and bottom member, and an intermediate member secured between said top and bottom member, said photocells being on said top member, the intermediate and bottom members having openings formed therein for cooling of said photocells.

7. A collapsible solar photoelectric battery as claimed in claim 6 wherein said intermediate member is constituted of foam plastic.

8. A collapsible solar photoelectric battery as claimed in claim 6 wherein said means pivotably connecting the plates comprises pivot pins, bearings supporting said pivot pins, and links in which said bearings are mounted, the latter said links being connected to the ends of the intermediate members of adjacent plates.

9. A collapsible solar photoelectric battery as claimed in claim 8 comprising retainers on said plates and spring means mounted on said bearings and bearing on said retainers to be subjected to tension with the linkage contracted.

References Cited

UNITED STATES PATENTS 3,326,497  6/1967  Michelson _____ 250—212

ALLEN B. CURTIS, Primary Examiner

M. J. ANDREWS, Assistant Examiner